United States Patent
Tse

(10) Patent No.: US 10,731,624 B2
(45) Date of Patent: Aug. 4, 2020

(54) TIDAL POWER GENERATION AND STORAGE SYSTEM AND METHOD OF CONSTRUCTING A RESERVOIR FOR SUCH A SYSTEM

(71) Applicant: Kwong Shing Tse, Biggar (GB)

(72) Inventor: Kwong Shing Tse, Biggar (GB)

( * ) Notice: Subject to any disclaimer, the term of this patent is extended or adjusted under 35 U.S.C. 154(b) by 0 days.

(21) Appl. No.: 15/511,700

(22) PCT Filed: Oct. 2, 2015

(86) PCT No.: PCT/GB2015/052892
§ 371 (c)(1),
(2) Date: Mar. 16, 2017

(87) PCT Pub. No.: WO2016/051201
PCT Pub. Date: Apr. 7, 2016

(65) Prior Publication Data
US 2017/0248112 A1    Aug. 31, 2017

(30) Foreign Application Priority Data
Oct. 3, 2014    (GB) .................................. 1417538.4

(51) Int. Cl.
*F03B 13/26*    (2006.01)
*F02B 9/08*    (2006.01)
(Continued)

(52) U.S. Cl.
CPC .............. *F03B 13/268* (2013.01); *E02B 9/08* (2013.01); *H02K 7/14* (2013.01); *H02K 7/183* (2013.01);
(Continued)

(58) Field of Classification Search
CPC . F03B 13/268; E02E 9/08; E02B 9/08; H02K 7/14; H02K 7/1823; H02K 7/183;
(Continued)

(56) References Cited

U.S. PATENT DOCUMENTS

| 4,282,444 A | * | 8/1981 | Ramer | .................... F03B 13/06 290/1 R |
| 4,288,985 A | * | 9/1981 | Dyck | .................... F03B 13/086 137/132 |

(Continued)

FOREIGN PATENT DOCUMENTS

| DE | 3107138 A1 | 9/1982 |
| EP | 2333311 A1 | 6/2011 |

(Continued)

OTHER PUBLICATIONS

Cabrele, Silvio, "International Search Report," prepared for PCT/GB2015/052892, dated Apr. 8, 2016, six pages.

*Primary Examiner* — Tulsidas C Patel
*Assistant Examiner* — Joseph Ortega
(74) *Attorney, Agent, or Firm* — Ross T. Robinson

(57) ABSTRACT

A tidal power generation and storage system (10) comprises a lagoon (12) and a plurality of reservoirs (14) separating the lagoon from an area of tidal water (16). Each reservoir (14) comprises a seawall (20) surrounding a reservoir chamber (22). The system has a first flow channel (30) in communication between the area of tidal water (16) and the lagoon (12) which directs flow through a turbine (32) to generate electrical power. The system also has a second flow channel (40) to allow communication between two adjacent reservoirs and a third flow channel (90) to allow communication between a reservoir and the first flow channel. The seawall (20) of each reservoir (14) comprises a gravity structure comprising a plurality of layers of a mixture of sand and/or other seabed material with a hydraulic binder. The system can be built using material sourced at the point of construction, and allows storage and pumping of water in the reservoirs (14) and lagoon (12) to maximise the period over which power can be generated.

6 Claims, 11 Drawing Sheets

(51) Int. Cl.
*H02K 7/14* (2006.01)
*H02K 7/18* (2006.01)
*E02B 9/08* (2006.01)

(52) U.S. Cl.
CPC ........ *H02K 7/1823* (2013.01); *F05B 2220/32* (2013.01); *F05B 2220/706* (2013.01); *Y02E 10/28* (2013.01); *Y02E 10/38* (2013.01); *Y02E 60/17* (2013.01)

(58) Field of Classification Search
CPC ........... F05B 2220/32; F05B 2220/706; Y02E 10/28; Y02E 10/38; Y02E 60/17
See application file for complete search history.

(56) References Cited

U.S. PATENT DOCUMENTS

| | | | | |
|---|---|---|---|---|
| 4,317,330 | A * | 3/1982 | Brankovics | F03B 17/061 290/54 |
| 5,929,531 | A * | 7/1999 | Lagno | F03B 13/262 290/42 |
| 7,262,517 | B1 * | 8/2007 | Srybnik | E02B 9/04 290/43 |
| 7,478,974 | B1 * | 1/2009 | Kelly | E02B 9/02 405/75 |
| 8,414,223 | B2 * | 4/2013 | French, Sr. | E02B 7/04 405/108 |
| 8,643,206 | B2 * | 2/2014 | Ekern | F03B 13/06 290/52 |
| 9,835,130 | B1 * | 12/2017 | McKinley | F03B 17/06 |
| 2010/0209192 | A1 * | 8/2010 | Behm | E02B 9/06 405/87 |
| 2011/0027107 | A1 * | 2/2011 | Bekken | F03B 13/06 417/330 |
| 2011/0204645 | A1 * | 8/2011 | Jacobson | F03B 13/08 290/54 |
| 2011/0289913 | A1 * | 12/2011 | Welch, Jr. | F03B 13/187 60/495 |
| 2012/0248777 | A1 * | 10/2012 | Ikemura | F03B 13/26 290/54 |
| 2012/0274070 | A1 * | 11/2012 | Payre | F03B 13/06 290/52 |
| 2014/0270965 | A1 * | 9/2014 | Igel, V | E02B 9/02 405/53 |
| 2016/0017860 | A1 * | 1/2016 | Smith | E02B 9/08 290/53 |
| 2016/0290310 | A1 * | 10/2016 | Bhende | F03B 13/086 |

FOREIGN PATENT DOCUMENTS

| | | |
|---|---|---|
| GB | 2401153 A | 11/2004 |
| GB | 2507362 A | 4/2014 |

* cited by examiner

TIDAL POWER GENERATION AND STORAGE SYSTEM AND METHOD OF CONSTRUCTING A RESERVOIR FOR SUCH A SYSTEM

TECHNICAL FIELD

The present disclosure relates to a tidal power generation and storage system which enables the generation of power while allowing multiple use of reservoirs and lagoons used in the tidal power generation system. The present disclosure also relates to a method of constructing an offshore reservoir for such a system, and a method of using such a system to generate power.

BACKGROUND

Conventional tidal power generation schemes are able to produce power at certain times when the tidal conditions are suitable. They are not able to produce power continuously and the supply cannot be tailored to times of peak demand.

Conventional tidal power generation schemes can interfere with navigation, and can act as a barrier to the use of the marine environment for other purposes.

It is an object of the present invention to overcome one or more of the above-mentioned problems.

SUMMARY

According to a first aspect of the invention there is provided a tidal power generation and storage system comprising a lagoon and a plurality of reservoirs separating the lagoon from an area of tidal water, wherein each reservoir comprises a seawall surrounding a reservoir chamber, wherein the system further comprises at least one first flow channel in communication between the area of tidal water and the lagoon, the first flow channel having a first closure means therein to selectively prevent water flowing through the first flow channel, and the first flow channel having a first turbine adapted to generate electrical power upon rotation of the first turbine by water flowing through the first flow channel, wherein the system further comprises at least one second flow channel selectively in communication between two adjacent reservoirs of the plurality of reservoirs and at least one third flow channel selectively in communication between at least one reservoir of the plurality of reservoirs and the first flow channel, and wherein the seawall of each reservoir comprises a gravity structure comprising a plurality of layers of a mixture of sand and/or other seabed material with a hydraulic binder.

Preferably the hydraulic binder is an inorganic material having pozzolanic or latent hydraulic properties. In one embodiment, the hydraulic binder may be limestone, blast furnace slag, siliceous fly ash, calcareous fly ash, ground granulated blast furnace slag (GGBFS or GGBS), silica fume or a mixture thereof.

The second flow channel may have a second closure means therein to selectively prevent water flowing through the second flow channel.

The second flow channel may include a pump adapted to pump water from a first of the adjacent reservoirs to a second of the adjacent reservoirs.

The second flow channel may have a second turbine adapted to generate electrical power upon rotation of the second turbine by water flowing through the second flow channel.

The third flow channel may be in communication between at least one reservoir of the plurality of reservoirs and the lagoon, the third flow channel having a third closure means therein to selectively prevent water flowing through the third flow channel. The third flow channel may include part of the first flow channel. The first turbine may be adapted to generate electrical power upon rotation of the first turbine by water flowing through the third flow channel.

Preferably the plurality of reservoirs are structurally linked to form a continuous tidal barrier.

According to a second aspect of the present invention there is provided a method of constructing a reservoir for a tidal power generation system comprising a lagoon and one or more reservoirs, comprising the following steps:

constructing an annular cofferdam in an area of tidal water;

removing water and/or seabed material from inside the cofferdam to form an annular volume;

filling the annular volume with a mixture of sand and/or other seabed material with a hydraulic binder, compacting the mixture of sand and/or other seabed material with a hydraulic binder, repeating the filling and compacting steps to form a plurality of layers, curing the mixture of sand and/or other seabed material with a hydraulic binder to form a continuous annular seawall, removing water and/or seabed material from inside the continuous annular seawall to form a reservoir chamber, and at least partially filling the reservoir chamber with water.

The method may include constructing a tidal power generation and storage system comprising a lagoon and a plurality of said reservoirs connected to form a tidal barrier which in use separates the lagoon from an area of tidal water, wherein each reservoir comprises a seawall surrounding a reservoir chamber, wherein the method further comprises providing at least one first flow channel in communication between the area of tidal water and the lagoon, the first flow channel having a first closure means therein to selectively prevent water flowing through the first flow channel, and the first flow channel having a first turbine adapted to generate electrical power upon rotation of the first turbine by water flowing through the first flow channel, and wherein the method further comprises providing at least one second flow channel selectively in communication between two adjacent reservoirs of the plurality of reservoirs and at least one third flow channel selectively in communication between at least one reservoir of the plurality of reservoirs and the first flow channel.

Preferably the hydraulic binder is an inorganic material having pozzolanic or latent hydraulic properties. In one embodiment, the hydraulic binder may be limestone, blast furnace slag, siliceous fly ash, calcareous fly ash, ground granulated blast furnace slag (GGBFS or GGBS), silica fume or a mixture thereof.

The annular cofferdam comprises contiguous piling or sheet piling. The piling may remain in situ after curing the mixture of sand and/or other seabed material with a hydraulic binder to form the continuous wall.

The annular volume may be filled to a level at least 5 m, preferably at least 6 m above mean high tide level of the area of tidal water. This has the advantage of providing sufficient mass to the wall and ensuring that the material of the continuous wall remains in compression even under large lateral loads.

The continuous wall in the region below mean low tide level of the area of tidal water may have a width of at least 5 m wide, typically at least 8 m wide. The width of the wall may be less above mean low tide level. The reservoir may have a substantially circular shape in plan. The reservoir may have a substantially rectangular shape in plan.

According to a third aspect of the present invention there is provided a method of operating a tidal power generation system comprising a lagoon and a plurality of reservoirs separating the lagoon from an area of tidal water, wherein each reservoir comprises a seawall surrounding a reservoir chamber, wherein the system further comprises at least one first flow channel in communication between the area of tidal water and the lagoon having a first water turbine therein, at least one second flow channel in communication between first and second adjacent reservoirs of the plurality of reservoirs, and at least one third flow channel in communication between one or both of the first and second adjacent reservoirs and the lagoon, the method comprising:

after the high tide state of the tidal water opening the first flow channel and thereby releasing water from the lagoon through the first flow channel to the tidal water, thereby driving the first turbine to generate electrical power, and subsequently closing the first flow channel;

after the low tide state of the tidal water opening the first flow channel and thereby releasing water from the tidal water through the first flow channel to the lagoon, thereby driving the first turbine to generate electrical power, and subsequently closing the first flow channel;

when the tide state permits opening the second and third flow channels and thereby releasing water from the first and/or second reservoirs through the third flow channel to the lagoon or the tidal water, thereby driving the first turbine to generate electrical power, and subsequently closing the third flow channel; and when the tide state permits opening the second and third flow channels and thereby releasing water from the lagoon or the tidal water through the third flow channel to the first and/or second reservoirs, thereby driving the first turbine to generate electrical power, and subsequently closing the third flow channel.

The method may include the further step of pumping water from the lagoon to the first and/or second reservoirs to raise the water level in the lagoons to a level higher than the level of the tidal water at the high tide state.

The method may include the further step of opening additional input flow channels during a rising tide state to permit the flow of water under gravity from the tidal water into the first and/or second reservoirs.

Preferably the steps of the method are repeated with each tide cycle of the tidal water.

The second flow channel may have a second water turbine or pump or combined turbine/pump therein.

The third channel may be partly or wholly coincident with the first or second flow channel. One or more valves may be provided to selectively open or close one or more of the first, second and third flow channels, or to divert flow along one or more of the first, second and third flow channels.

According to a fourth aspect of the present invention there is provided a method of operating a tidal power generation system comprising a lagoon and a plurality of reservoirs separating the lagoon from an area of tidal water, wherein each reservoir comprises a seawall surrounding a reservoir chamber, wherein the system further comprises at least one first flow channel in communication between the area of tidal water and the lagoon having a first water turbine therein, at least one second flow channel in communication between first and second adjacent reservoirs of the plurality of reservoirs, and at least one third flow channel in communication between one or both of the first and second adjacent reservoirs and the lagoon, the method comprising:

during a high tide state of the tidal water opening the third flow channel and thereby releasing water from the first and/or second reservoirs through the third flow channel to the lagoon, thereby driving a turbine to generate electrical power, and subsequently closing the third flow channel;

after the high tide state of the tidal water opening the first flow channel and thereby releasing water from the lagoon through the first flow channel to the tidal water, thereby driving the first turbine to generate electrical power, and subsequently closing the first flow channel;

after the high tide state of the tidal water pumping water from the second reservoir to the first reservoir to raise the level in the first reservoir above the mean high tide level of the tidal water;

during a low tide state of the tidal water opening the third flow channel and thereby releasing water from the lagoon through the third flow channel to the first and/or second reservoirs, thereby driving a turbine to generate electrical power, and subsequently closing the third flow channel;

after the low tide state of the tidal water opening the first flow channel and thereby releasing water from the tidal water through the first flow channel to the lagoon, thereby driving the first turbine to generate electrical power, and subsequently closing the first flow channel; and after the low tide state of the tidal water pumping water from the lagoon to the second reservoir to raise the level in the second reservoir above the mean high tide level of the tidal water.

The second flow channel may have a second water turbine or pump or combined turbine/pump therein.

The third channel may be partly or wholly coincident with the first or second flow channel. One or more valves may be provided to selectively open or close one or more of the first, second and third flow channels, or to divert flow along one or more of the first, second and third flow channels.

The high tide state includes a period before and after high tide, typically up to 2 hours either side. The low tide state includes a period before and after low tide, typically up to 2 hours either side.

The third flow channel may be selectively in communication with one or both of the first and second flow channels. For example during the high tide state of the tidal water when the third flow channel is open, water may be released from the first reservoir to the second reservoir through the second flow channel and from there, by a switchable valve, through the first flow channel to the lagoon, while the first flow channel remains closed to the sea. The flow of water through the first flow channel may drive the first turbine.

By way of further example, during the low tide state of the tidal water when the third flow channel is open, water may be released from the lagoon to the first and/or second reservoirs through the first channel and from there, by a switchable valve, through the second channel to the reservoirs, while the first flow channel remains closed to the sea. The flow of water through the first flow channel may drive the first turbine.

Preferably the steps of the method are repeated with each tide cycle of the tidal water.

At least one of the above embodiments provides one or more solutions to the problems and disadvantages with the background art. Other technical advantages of the present disclosure will be readily apparent to one skilled in the art from the following description and claims. Various embodiments of the present application obtain only a subset of the advantages set forth. No one advantage is critical to the embodiments. Any claimed embodiment may be technically combined with any other claimed embodiment(s).

BRIEF DESCRIPTION OF THE DRAWINGS

The accompanying drawings illustrate exemplary embodiments of the disclosure and serve to explain, by way of example, the principles of the disclosure.

DETAILED DESCRIPTION

Figure 1:
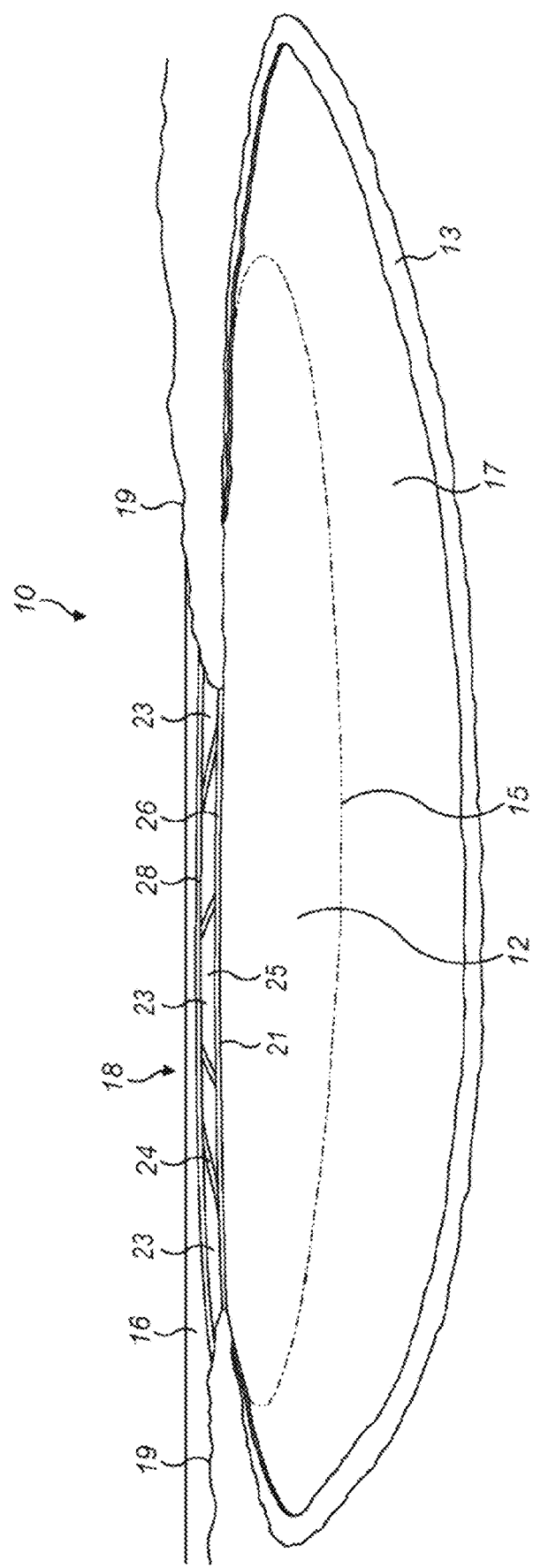
FIG. 1 is a diagrammatic illustration of a tidal power generation and storage system according to an exemplary embodiment of the disclosure.
Figure 2:
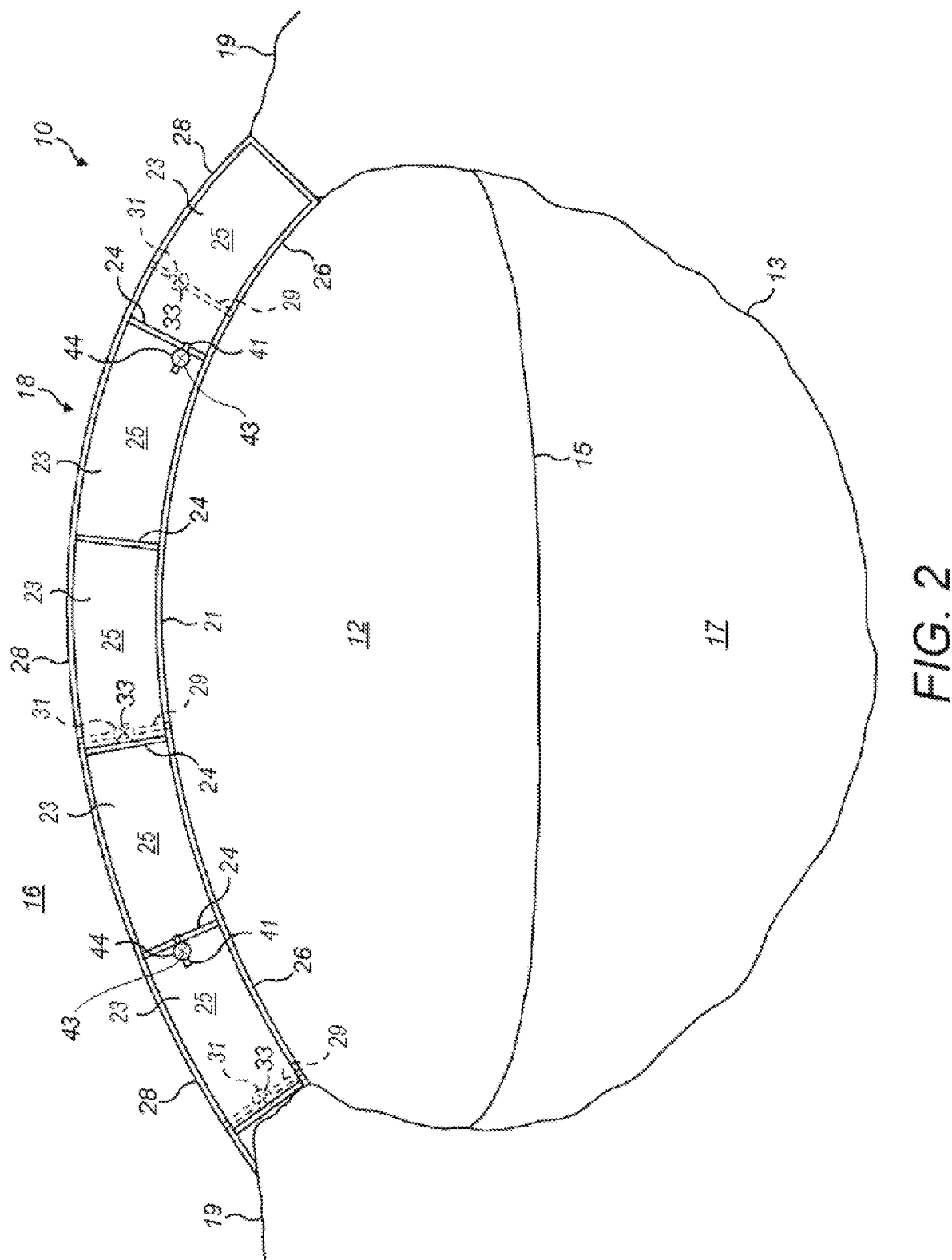
FIG. 2 is a plan view of the tidal power generation and storage system of FIG. 1.

Referring to FIGS. 1 and 2 there is shown a tidal power generation system 10 according to an embodiment of the invention. The system comprises a lagoon 12 and a plurality of reservoirs 23 separating the lagoon 12 from an area of tidal water 16, which may be the open sea or an estuary. The reservoirs 23 are linked together structurally to form a tidal barrier 18, which may extend for 8 km or more.

The system 10 is constructed in an appropriate location, so that the tidal volume of water in the lagoon 12 is maximised and the required length of tidal barrier 18 is minimised. An existing bay or area between natural headlands 19 forms an ideal location. The lagoon 12 may be bounded by an existing shoreline 13. In use the lagoon may optionally adopt a new shoreline 15, thereby generating an area of reclaimed land 17 between the existing shoreline 13 and the new shoreline 15

Each reservoir 23 comprises a seawall 21 surrounding a reservoir chamber 25. In the embodiment of FIGS. 1 and 2, where the reservoirs 23 are substantially rectangular in plan, the intermediate seawalls 24 are common to two adjacent reservoirs 23.

The system includes a number of first flow channels 29 in communication between the area of tidal water 16 and the lagoon 12. Typically each flow channel 29 may be a large diameter pipe extending from the inner wall 26 of a reservoir 23 to the outer wall 28 of the reservoir 23. The first flow channel 29 has a first closure means 33, typically a valve, to selectively prevent water flowing through the first flow channel 29. The first flow channel 29 has a first turbine 31 located within the first flow channel 29 for generating electrical power upon rotation of the first turbine 31 by water flowing through the first flow channel 29 from the sea 16 to the lagoon 12 or vice versa.

The system also includes a number of second flow channels 41 in communication between two adjacent reservoirs 23 of the plurality of reservoirs. Typically each second flow channel 41 may be a large diameter pipe extending through the intermediate seawall 24. The second flow channel 41 has a second closure means 43 to selectively prevent water flowing through the second flow channel 41. The second flow channel 41 has a second turbine 44 located within the second flow channel for generating electrical power upon rotation of the second turbine 44 by water flowing through the second flow channel 41 from one reservoir 23 to the adjacent reservoir. The second turbine may be reversible and serve as a pump, as is described later. Alternatively a separate second flow channel with a pump and its own valve(s) may be provided next to the second flow channel housing the second turbine 44.

Figure 3:
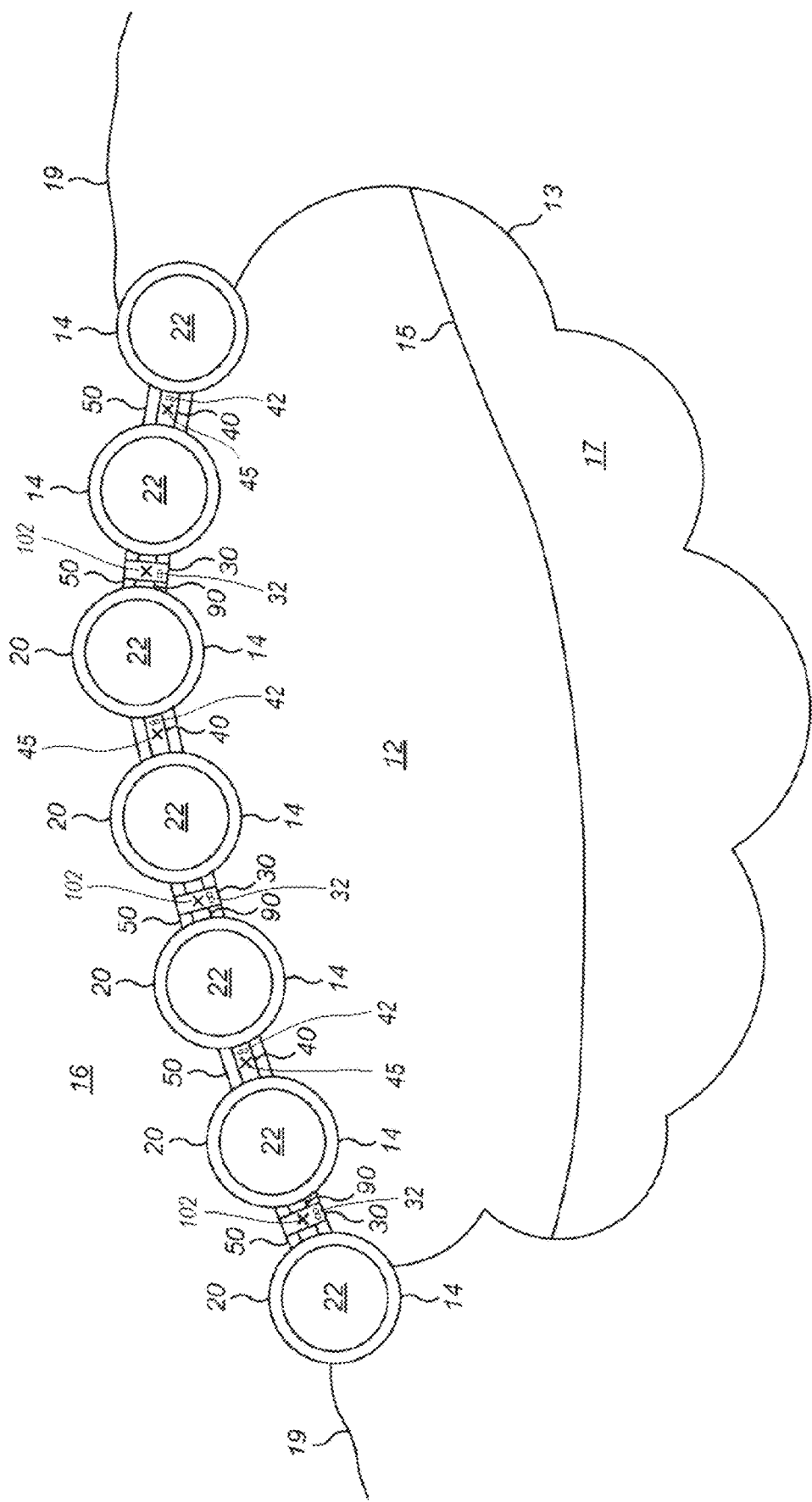
FIG. 3 is a plan view of another tidal power generation and storage system according to an exemplary embodiment of the disclosure.

FIG. 3 shows a tidal power generation system 10 according to another embodiment of the invention. It differs from the embodiment of the invention shown in FIGS. 1 and 2 in that the reservoirs 14 are circular in plan view. Each reservoir chamber 22 is surrounded by a separate continuous seawall 20. However the reservoirs can be any appropriate shape, and are not limited to circles. Where elements of the system are the same as in FIGS. 1 and 2, they are not further described. In this embodiment a first flow channel 30 is provided between adjacent reservoirs. A short length of linking seawall 50 is provided between each adjacent pair of reservoirs 14 in order to form an unbroken tidal barrier 18. FIG. 3 is schematic, and in practice this length of seawall may be as small as 1 or 2 metres, while the diameter of each reservoir may be 500 m or 1000 m. The first flow channel 30 extends through the linking seawall 50. A second flow channel 40 is also provided between adjacent reservoirs through the linking seawall 50 and may include a second turbine 42 and second closure means 45. Alternate linking seawalls are provided with first 30 and second 40 flow channels respectively.

A seawall 20 of each reservoir is preferably constructed as a gravity structure comprising a mixture of sand and/or other seabed material with a hydraulic c binder. The hydraulic binder is an inorganic material having pozzolanic or latent hydraulic properties, for example limestone, blast furnace slag, siliceous fly ash, calcareous fly ash, ground granulated blast furnace slag (GGBFS or GGBS), silica fume or a mixture thereof. Such binders have been used for road construction in developing countries, but the inventors have recognised that the binder may be used for the construction of seawalls 20.

Figure 4:
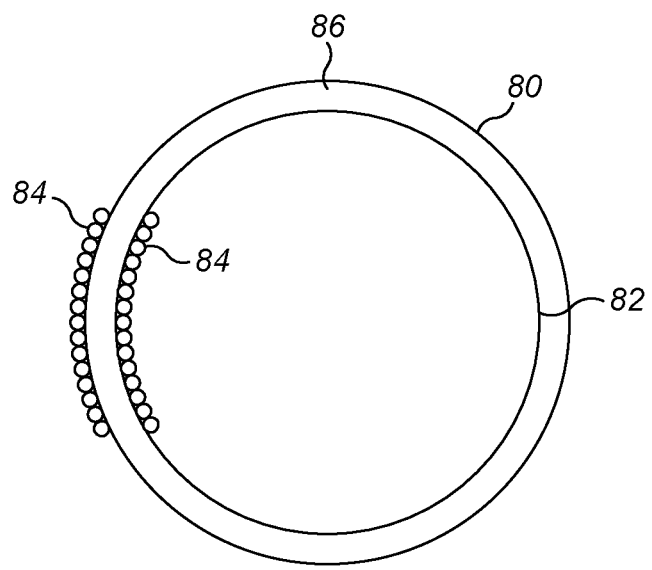
FIG. 4 is a diagrammatic illustration in plan of the construction of a reservoir according to an exemplary embodiment of the disclosure.
Figure 5:
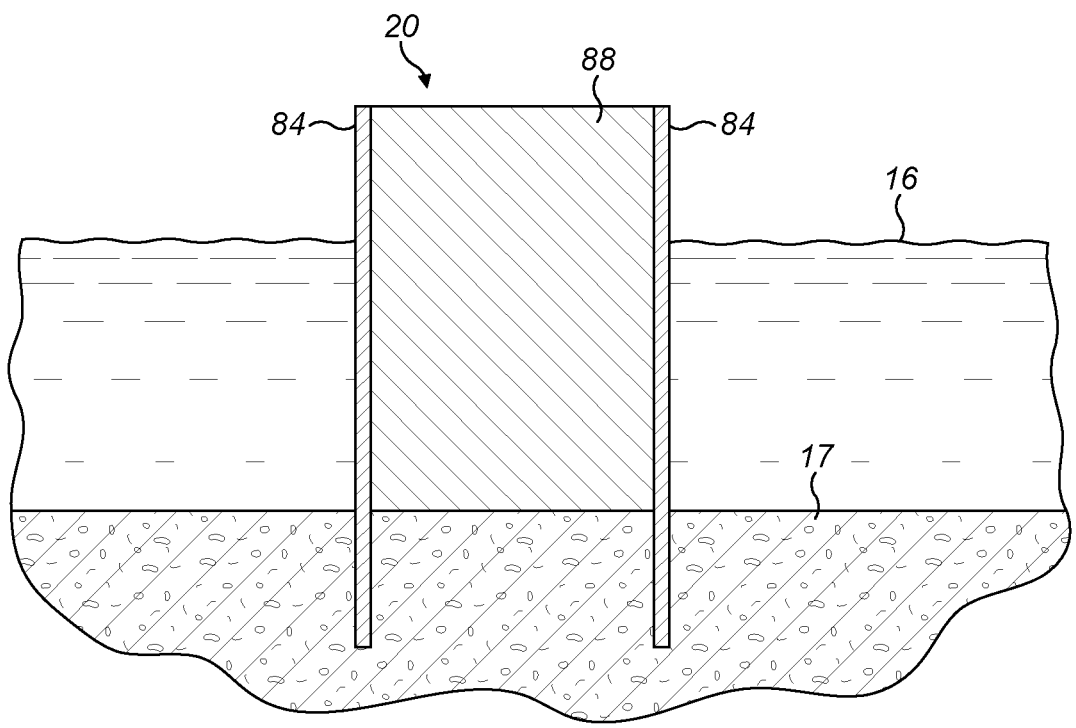
FIG. 5 is a diagrammatic illustration in section of the construction of a reservoir according to an exemplary embodiment of the disclosure.

A method of constructing the reservoir 14 is described with reference to FIGS. 4 and 5. In this example a circular reservoir 14 is shown, but the method can be used with a reservoir of any shape.

First two concentric rings 80, 82 of piles 84, for example sheet piles or contiguous concrete piles, are installed by any suitable process and driven into the seabed 17 to form an annular cofferdam in an area of tidal water. Once the cofferdam has been made substantially watertight, for example by pumping any water ingress, water and seabed material are removed by pumping and/or excavation from inside the cofferdam to form an annular volume 86. The annular volume is typically 8 m wide and has a diameter of several hundred metres. The annular volume is then filled with a mixture 88 of sand and/or other seabed material with a hydraulic binder. The hydraulic binder is an inorganic material having pozzolanic or latent hydraulic properties, for example limestone, blast furnace slag, siliceous fly ash, calcareous fly ash, ground granulated blast furnace slag (GGBFS or GGBS), silica fume or a mixture thereof.

The sand may be sand which was already removed from the annular volume 86, or it may be sand arising from other excavations. The mixture 88 of sand and/or other seabed material is compacted with a hydraulic binder. Typically the sand and binder are introduced in multiple layers. Each layer has a thickness of 100 to 300 mm and after being introduced is rolled by a suitable compactor. The hydraulic binder then causes curing of the mixture 88 of sand and/or other seabed material to form a concrete-like material. The material forms a gravity wall within the concentric rings 80, 82 of piles.

If required the piles 84 may be cut back after the mixture has cured, for example to a level above mean low tide.

If required the wall 20 may be continued above the piles 84. The width of the wall may be reduced above the mean low tide level.

Once the wall 20 is complete, water and/or seabed material may be removed from inside the continuous wall 20 to form a reservoir chamber 22. The seabed material may be reused, either for land reclamation adjacent to the lagoon 12, or for the construction of further seawalls 20. The reservoir chamber 22 may then be filled with water, either by pumping, or by allowing the ingress of tidal water through a suitable flow channel 40.

Typically the annular volume 86 is filled with the sand and binder mixture 88 to a level at least 5 m, preferably at least 6 m above mean high tide level of the surrounding sea 16.

Typically the continuous wall 20 in the region below mean low tide level surrounding sea 16 is at least 5 m wide, preferably at least 8 m wide.

The method of operating a tidal power generation system according to an embodiment of the invention is now described with reference to FIGS. 6 to 13, which show first 14A and second 14B adjacent reservoirs, similar to those shown in FIGS. 3 to 5.

The system includes a first flow channel 30 in communication between the sea 16 and the lagoon 12 having a first turbine 32 therein, a second flow channel 40 in communication between the first and second adjacent reservoirs 14A, 14B having a second turbine 42 therein, and at least one third flow channel in communication between one or both of the first and second adjacent reservoirs and the lagoon. In this example the third flow channel 90, seen in FIG. 6 but illustrated in more detail in FIG. 14, includes a section 92 which leads to the first flow channel 30 as well as part of the first flow channel 30 itself. In this example it is assumed that high tide is at 01:00, low tide is at 07:00, and high tide is at 13:00.

Figure 6:
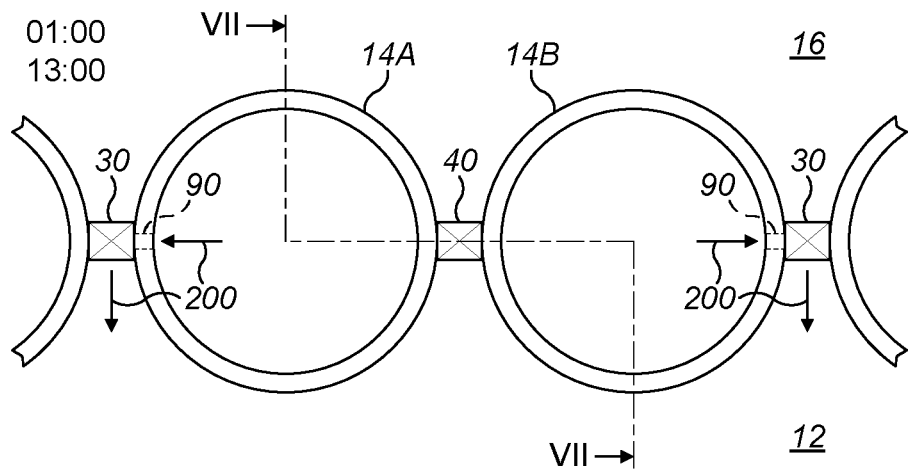
FIGS. 6 to 13 are schematic illustrations in plan and section of the various stages of operation of a tidal power generation and storage system according to an exemplary embodiment of the disclosure.
Figure 7:
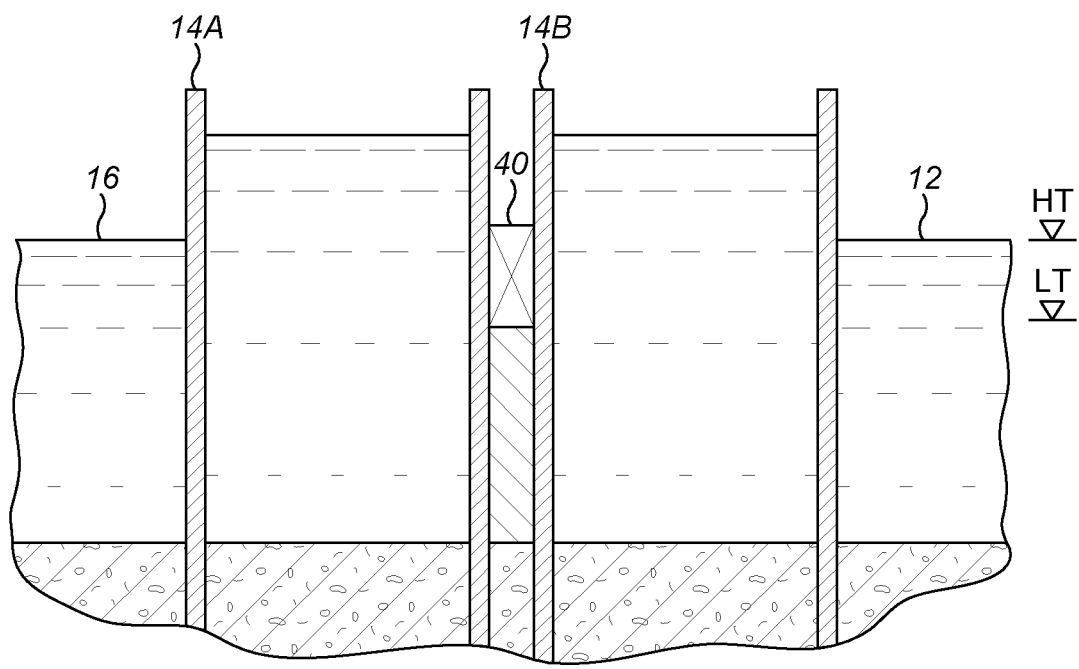
Figure 8:
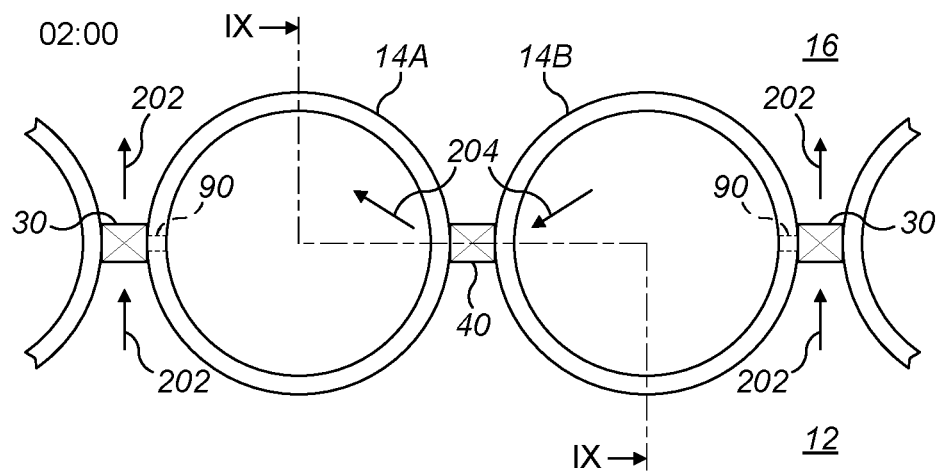
Figure 9:
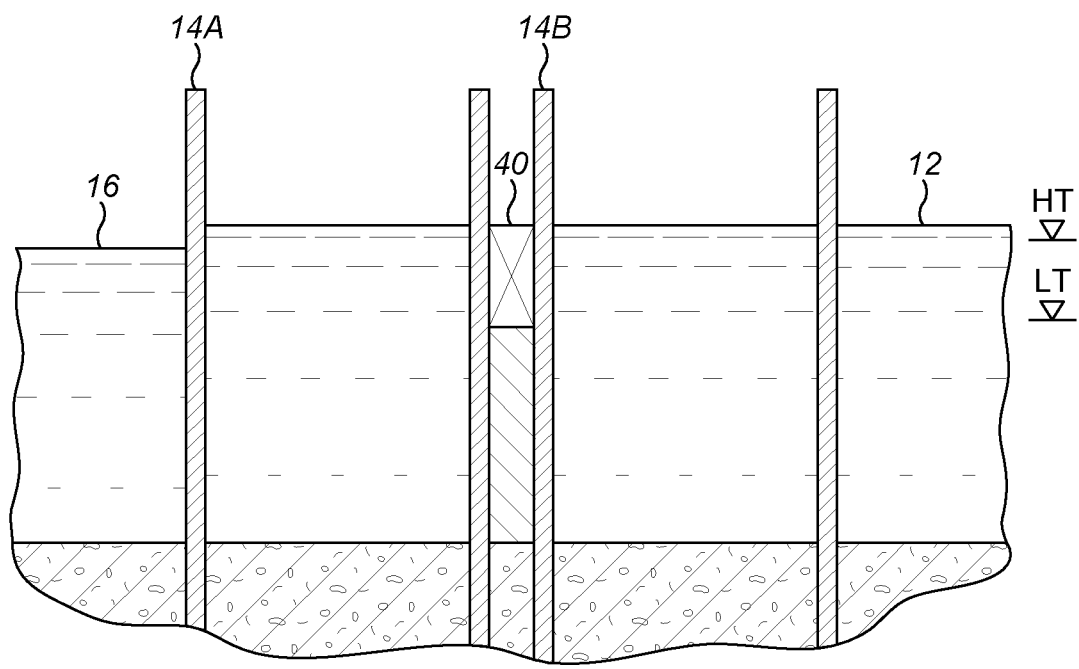
Figure 10:
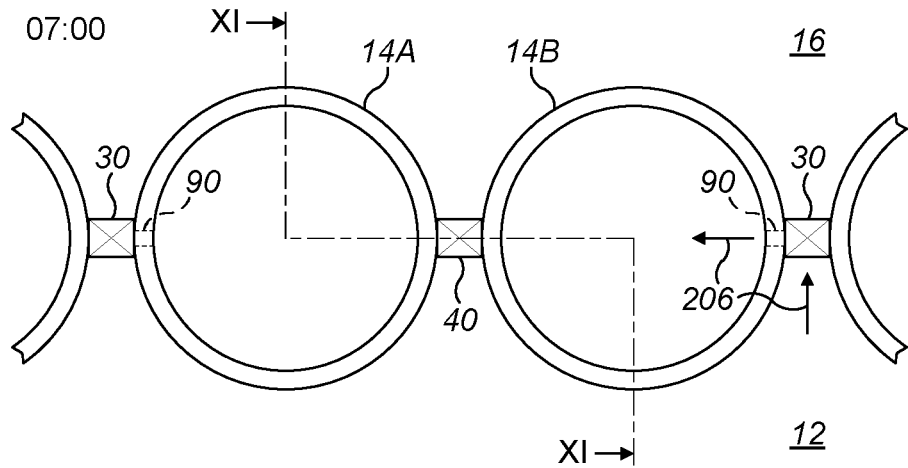
Figure 11:
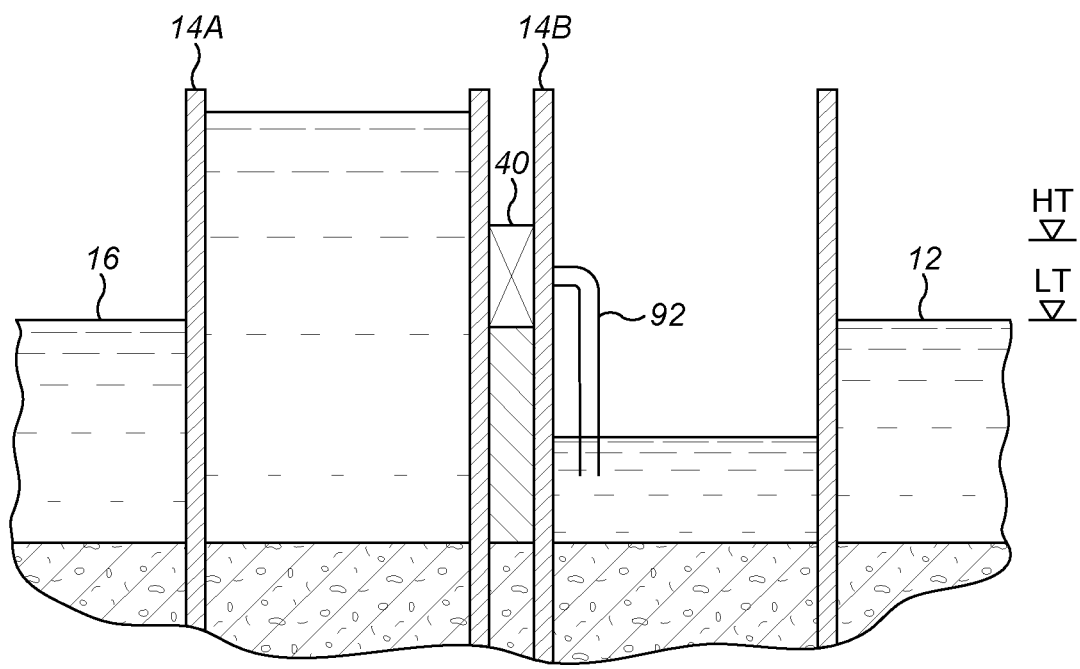
Figure 12:
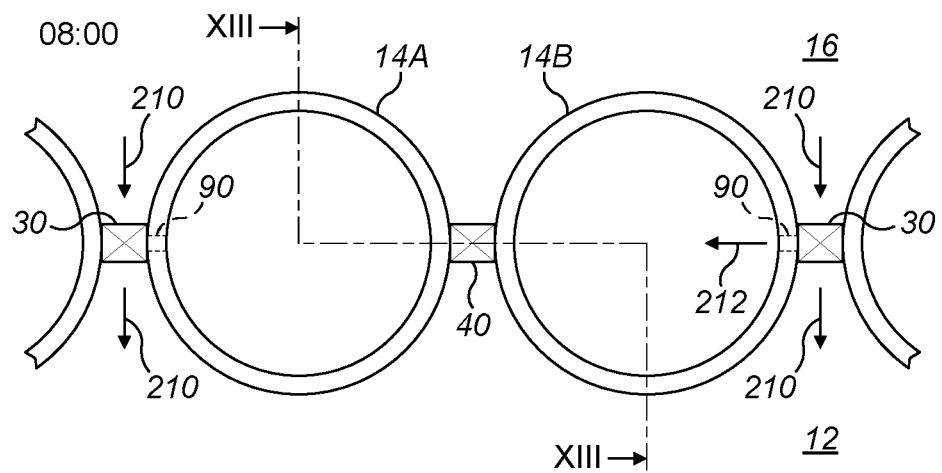
Figure 13:
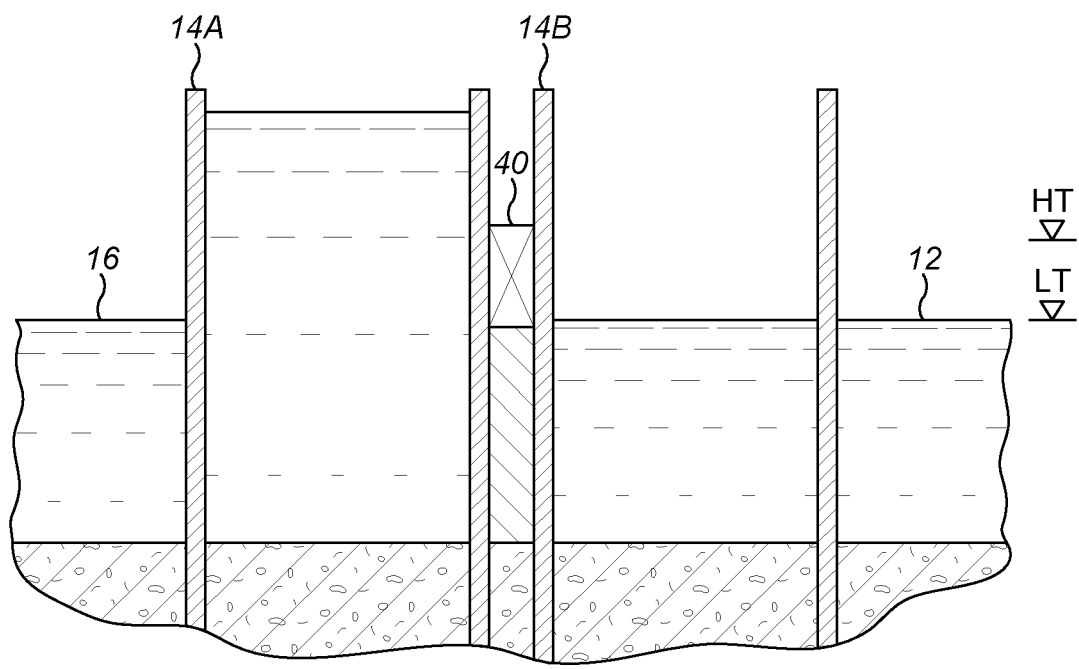

The operating method includes the following stages:

1. At 01:00 the sea is in a high tide state as shown in FIGS. 6 and 7. The water level in the reservoirs 14A, 14B is about 6 m above high tide level. At or about high tide the third flow channel is opened by opening a valve (not shown) and water is released from the first and/or second reservoirs 14A, 14B in the direction of arrows 200 through the third flow channel 90 to the lagoon, thereby driving the turbine 32 to generate electrical power. A valve 102 (e.g., see FIG. 14) is then closed to close the third flow channel after the system has reached the state shown in FIGS. 8 and 9. The system thus enables the production of power even at high tide, when the tide is slack.
2. At about 02:00 the sea is in a tide state as shown in FIGS. 8 and 9, below high tide. The water levels in the reservoirs 14A and 14B and the lagoon 12 are the same. At some time after the high tide state of the tidal water, a valve (not shown) is opened to open the first flow channel 30 and thereby release water in the direction of arrows 202 from the lagoon through the first flow channel 30 to the sea 16, thereby driving the first turbine 32 to generate electrical power.
3. While water is flowing from the lagoon 12 to the sea 16 to generate power, some of the power is used to pump water in the direction of arrows 204 from the second reservoir 14B to the first reservoir 14A to raise the level in the first reservoir above the mean high tide level of the tidal water. The pump may be a separate pump (not shown), or it may be a reversible pump/turbine 42 provided in the second flow channel 40. If required, an additional pipe 92 can be connected to the second flow channel 40 (see FIG. 11). A valve (not shown) is then closed to close the first flow channel 30 after the system has reached the state shown in FIGS. 10 and 11. In the meantime pumping through the second flow channel 40 has been stopped.
4. At 07:00 the sea is in a low tide state as shown in FIGS. 10 and 11. At or about low tide the third flow channel is opened by opening a valve (not shown) and water is released from the lagoon in the direction of arrows 206 to the first and/or second reservoirs 14A, 14B through the third flow channel 90, thereby driving the turbine 32 to generate electrical power. The valve 102 (e.g., see FIG. 14) is then closed to close the third flow channel after the system has reached the state shown in FIGS. 12 and 13. The system thus enables the production of power even at low tide, when the tide is slack.
5. At about 08:00 the sea is in a tide state as shown in FIGS. 12 and 13, above low tide. The water levels in the reservoir 14B and the lagoon 12 are the same. At some time after the low tide state of the tidal water, a valve (not shown) is opened to open the first flow channel 30 and thereby release water in the direction of arrows 210 from the sea 16 through the first flow channel 30 to the lagoon 12, thereby driving the first turbine 32 to generate electrical power.
6. While water is flowing from the sea 16 to the lagoon 12 to generate power, some of the power is used to pump water in the direction of arrows 212 from the lagoon 12 to the second reservoir 14B to raise the level in the second reservoir 14B to the same level as the first reservoir 14A. The pump may be a separate pump (not shown). A valve (not shown) is then closed to close the first flow channel 30 after the system has again reached the state shown in FIGS. 6 and 7. In the meantime pumping from the lagoon 12 to the second reservoir 14B has been stopped.

Steps 1 to 6 above are then repeated with the tide cycle.

Figure 14:
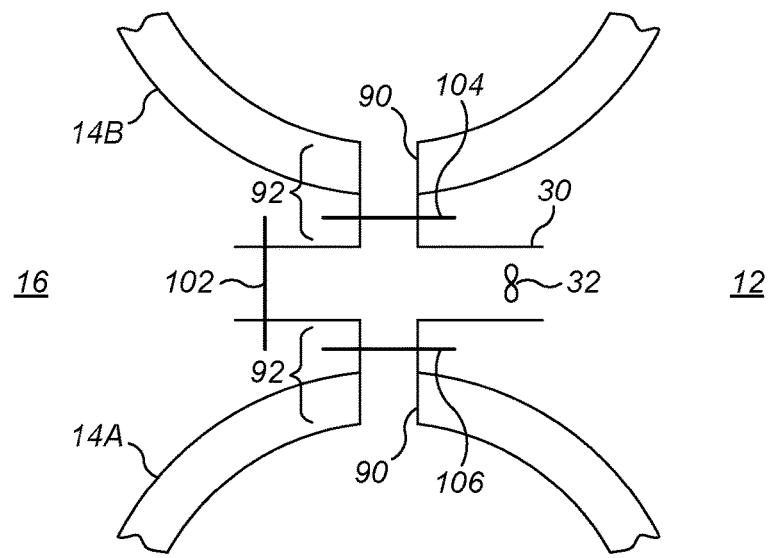
FIG. 14 is a diagrammatic illustration of the flow channel between two adjacent reservoirs of the system of FIG. 3.

FIG. 14 shows the first 30 and third 90 flow channels in more detail. When water is flowing from the sea 16 to the lagoon 12 or vice versa and driving the turbine 32, valve 102 is open and valves 104 and 106 are closed, so that the third flow channel 90 is closed. When water is flowing from the reservoir 14A, 14B to the lagoon 12 or vice versa and driving the turbine 32, valve 102 is closed and valves 104 and 106 are open, so that the first flow channel 30 is closed. Part of the first flow channel 30 containing the turbine 32 remains open, but now forms part of the third flow channel 90.

In addition to generating power the tidal power generation system has a number of other functions. The reservoir of each of the plurality of reservoirs can be used for agriculture, for example fish farming. The reservoirs are well suited for fish farming because the water within them is provided with a means of water circulation.

Figure 15:
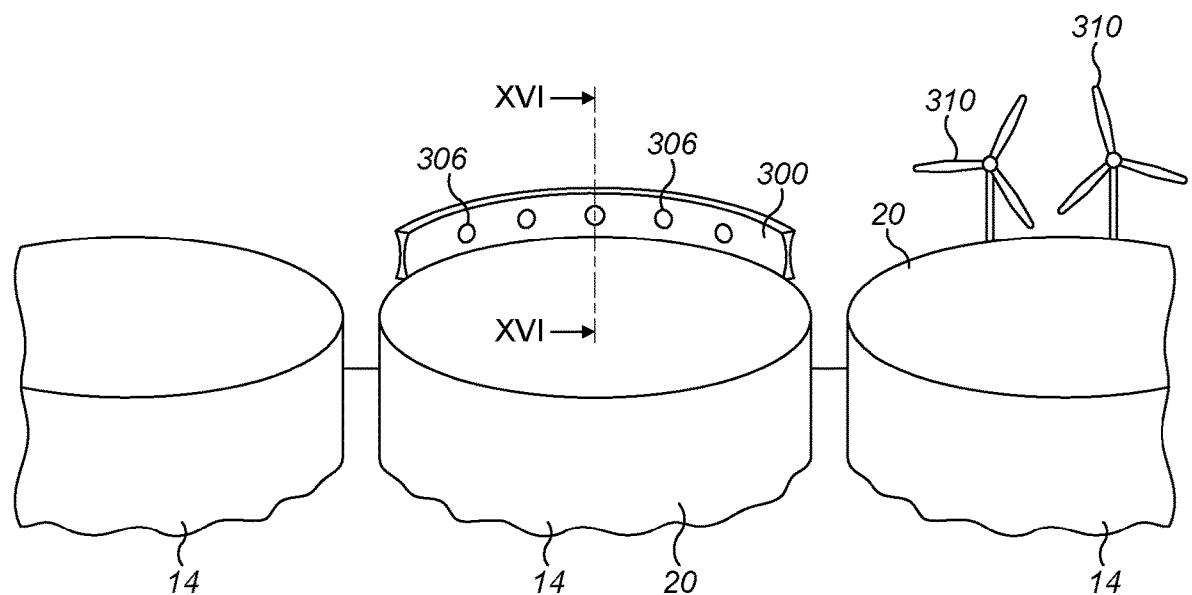
FIG. 15 is a diagrammatic illustration of a wind turbine arrangement installed on the system of FIG. 3.
Figure 16:
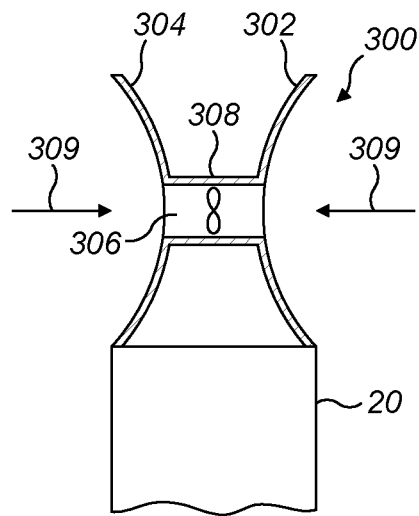
FIG. 16 is a sectional view through the wind turbine arrangement of FIG. 15.

Each reservoir can include wind power generation means. For example wind turbines can be constructed on top of the seawalls 20. FIGS. 15 and 16 show possible arrangements of wind turbines. A collector screen 300 can be mounted on the top of the seawall 20 of a reservoir 14. The screen 300 comprises forward and rearward facing concave screens 302, 304 in which spaced apertures 306 are provided at the centre, typically every 30 to 100 m, extending between the two concave screens. The screen 300 is typically 5 to 10 m high. A wind turbine 308 is located in each aperture. Wind in the direction of the arrows 309 is channelled by the concave screens 302, 304 to the centre, where it passes through the apertures 306, maximising the power obtained from the turbines 308.

Alternatively, or in addition, conventional free standing wind turbines 310 can be mounted to the top of the seawall 20.

The whole system can be used as a coastline defence, which can protect the coastline from erosion or flooding.

The whole system can be used as a method of reclaiming land from the sea. On this land an eco-tourism and education system can be built.

The whole system can be used as a means to purify water.

Figure 17:
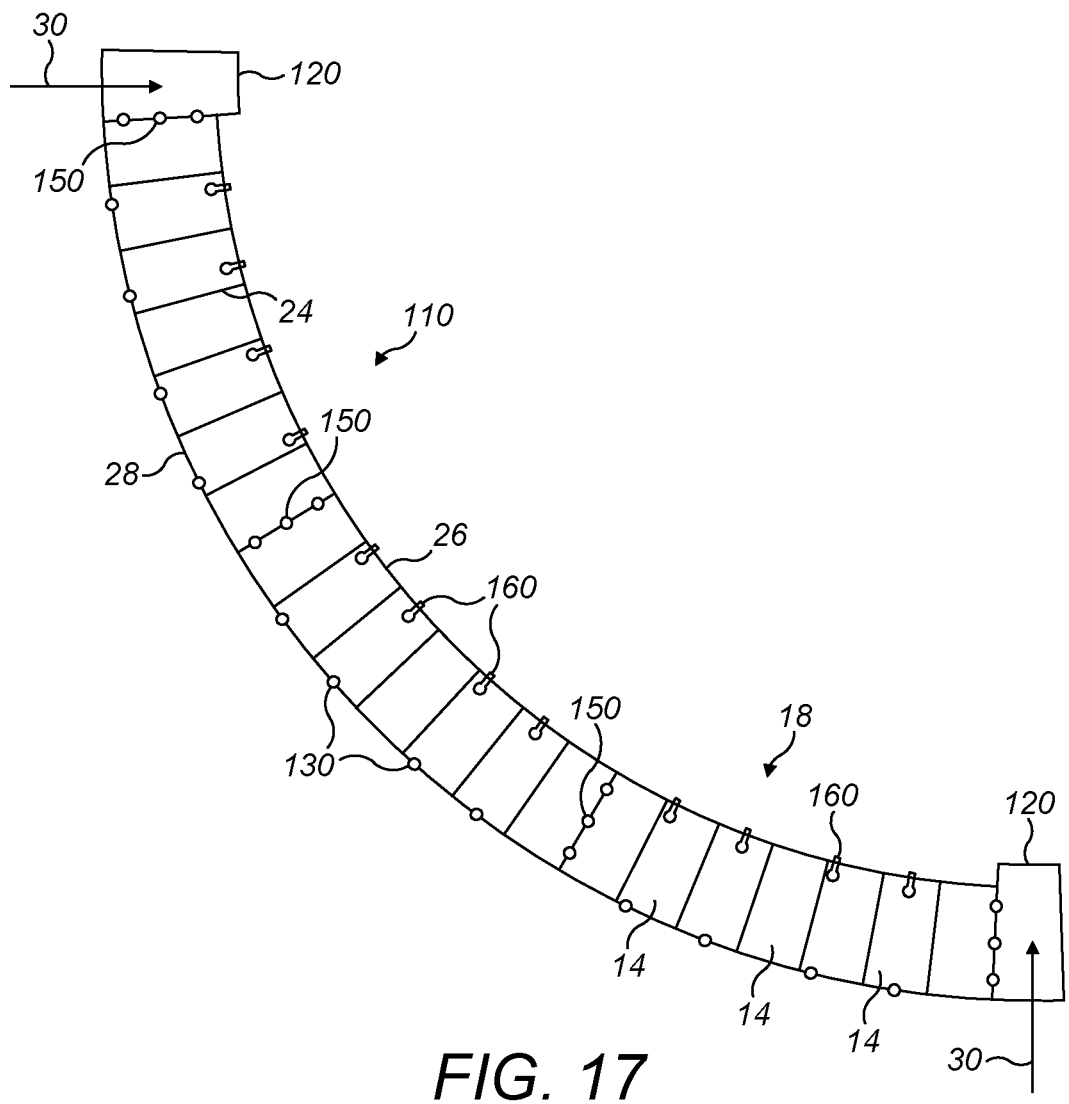
FIG. 17 is a partial plan view of part of the seawall of a tidal power generation and storage system according to another exemplary embodiment of the disclosure.
Figure 18:
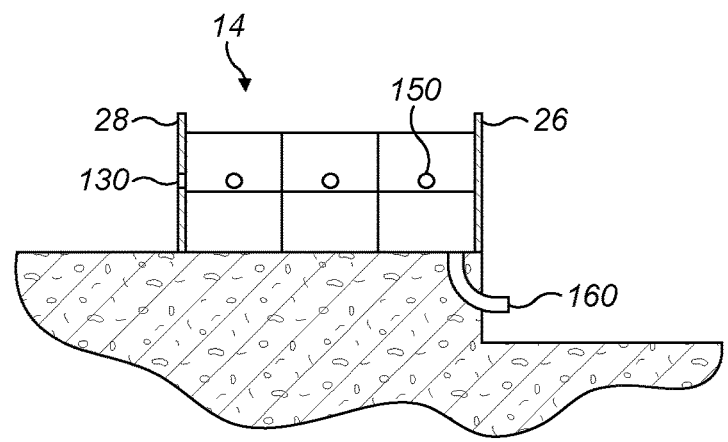
FIG. 18 is a sectional view through the seawall of FIG. 17.
Figure 19:
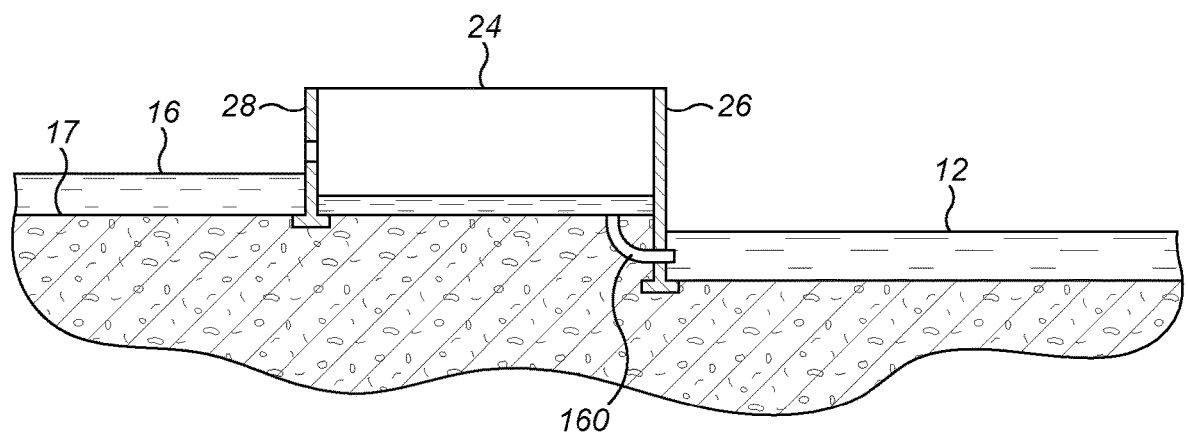
FIG. 19 is a schematic illustration in section of a stage of operation of the system of FIG. 17.

FIGS. 17 to 19 show a further embodiment of a tidal power generation system 110 of the present disclosure. FIG. 17 shows one quadrant only of the tidal barrier 18 and lagoon 12, which in use is linked with three other identical quadrants to form, in plan, a circular tidal barrier 18 enclosing a circular lagoon 12. Typically the lagoon 12 may have a diameter of 1500 m and each reservoir 14 making up the seawall may have a width of up to 100 m. The seawalls, including the intermediate walls 24, inner walls 26 and outer walls 28 which surround each reservoir chamber 22 to form the reservoirs 14, may be formed by the method described above, in a marine location with a suitable tidal range. The system can be built out at sea, and does not require the use of existing shoreline.

In this example the lagoon 12 may be excavated after construction of the tidal barrier 18 so that the lagoon 12 has a floor level lower than the adjacent sea-bed 17, typically by up to 5 m, thereby increasing the capacity of the lagoon 12. Turbines 32, 42 are provided in four power and pump houses 120 located around the seawall.

On a rising tide, sea water enters the tanks 14 from the sea 16, and water enters the lagoon 12 from the sea 16 through the first flow channels 30 through the power and pump houses 120, thereby powering the turbines 32, 42. In this embodiment there are additional input flow channels 130 provided from the sea 16 to each tank or reservoir 14, to enable each tank to be filled quickly.

At high tide the tanks 14 are full to high tide level, while the lagoon does not fill completely, because of the flow restriction of the turbines.

If required the input flow channels 130 can be closed and pumps 140 in the power and pump houses 120 can use some of the power generated by water flowing into the lagoon 12 to pump water from the lagoon 12 into the tanks 14, to a level higher than high tide level, typically up to 5 m higher.

Once the tide turns, then water in the tanks 14 can be directed through the second 150 and/or third 160 flow channels to the sea and/or the lagoon through the turbines, to generate power. Optionally turbines and/or pumps (not shown) may be provided in the channels 160 joining the tanks 14 and lagoon 12.

Optionally, once the sea level falls below that of the lagoon 12, water can be directed from the lagoon 12 through the turbines 32, 42 to the sea 16 to generate power, until low tide is reached. The process is then repeated.

It is to be understood that suitable control systems and valves (not shown) are provided to control the flow of water through the turbines and pumps.

The provision of reservoir in conjunction with a lagoon allows power to be generated for a longer period within the tide cycle than with a simple single lagoon system, In periods of high tidal flow, some of the energy produced can be used to pump water into the reservoirs so that in periods of low tidal flow water from the reservoirs can instead be used to generate power.

This written description uses examples to disclose the invention, including the best mode, and also enables any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A tidal electric power generation water storage system, the water storage system comprising:
   a lagoon;
   a plurality of reservoirs separating the lagoon from an area of tidal water, each reservoir of the plurality of reservoirs comprising a seawall surrounding a reservoir chamber;
   a first flow channel selectively in communication between the area of tidal water and the lagoon, the first flow channel having a first closure means therein to selectively allow water to flow through the first flow channel, and the first flow channel having a first turbine adapted for rotation by water flowing through the first flow channel;
   a second flow channel coupled between two adjacent reservoirs of the plurality of reservoirs, the second flow channel configured to selectively allow flow of water between the two adjacent reservoirs;
   a third flow channel coupled between at least one reservoir of the plurality of reservoirs and the first flow channel, the third flow channel configured to selectively allow flow of water between the at least one reservoir and the first flow channel;

wherein the seawall of each reservoir comprises a gravity structure comprising a plurality of layers of a mixture of sand and/or other seabed material with a hydraulic binder; and wherein the second flow channel has a second turbine adapted to operate in a first mode that pumps water from a first of the two adjacent reservoirs to a second of the two adjacent reservoirs, and a second mode in which water flowing through the second flow channel from the second of the two adjacent reservoirs to the first of the two adjacent reservoirs rotates the second turbine.

2. The tidal electric power generation water storage system according to claim 1, wherein the hydraulic binder is an inorganic material having pozzolanic or latent hydraulic properties.

3. The tidal electric power generation water storage system according to claim 1, wherein the hydraulic binder is limestone, blast furnace slag, siliceous fly ash, calcareous fly ash, ground granulated blast furnace slag (GGBFS or GGBS), silica fume or a mixture thereof.

4. The tidal electric power generation water storage system according to claim 1, wherein the second flow channel has a second closure means therein to selectively prevent water flowing through the second flow channel.

5. The tidal electric power generation water storage system according to claim 1, wherein the third flow channel is in communication between at least one reservoir of the plurality of reservoirs and the lagoon, the third flow channel having a third closure means therein to selectively prevent water flowing through the third flow channel.

6. The tidal electric power generation water storage system according to claim 1, wherein the plurality of reservoirs are structurally linked to form a continuous tidal barrier.

\* \* \* \* \*